W. BOGGETT.
AIR BEDS AND CUSHIONS.

No. 180,528.  Patented Aug. 1, 1876.

UNITED STATES PATENT OFFICE.

WILLIAM BOGGETT, OF CHELSEA, ENGLAND.

IMPROVEMENT IN AIR BEDS AND CUSHIONS.

Specification forming part of Letters Patent No. 180,528, dated August 1, 1876; application filed July 6, 1876.

*To all whom it may concern:*

Be it known that I, WILLLIAM BOGGETT, of Chelsea, in the county of Middlesex, England, have invented a new and useful Improvement in Air Beds and Cushions; and I do hereby declare that the following is a full, clear, and exact description of the same, reference being had to the accompanying drawing, which forms part of this specification:

The invention consists in an air bed or cushion, having its upper and lower or opposite surfaces united after the manner of tufting at regular or irregular distances apart by means of eyelets, which not only serve to hold the bed or cushion in form, but also to ventilate it.

Figure 1:
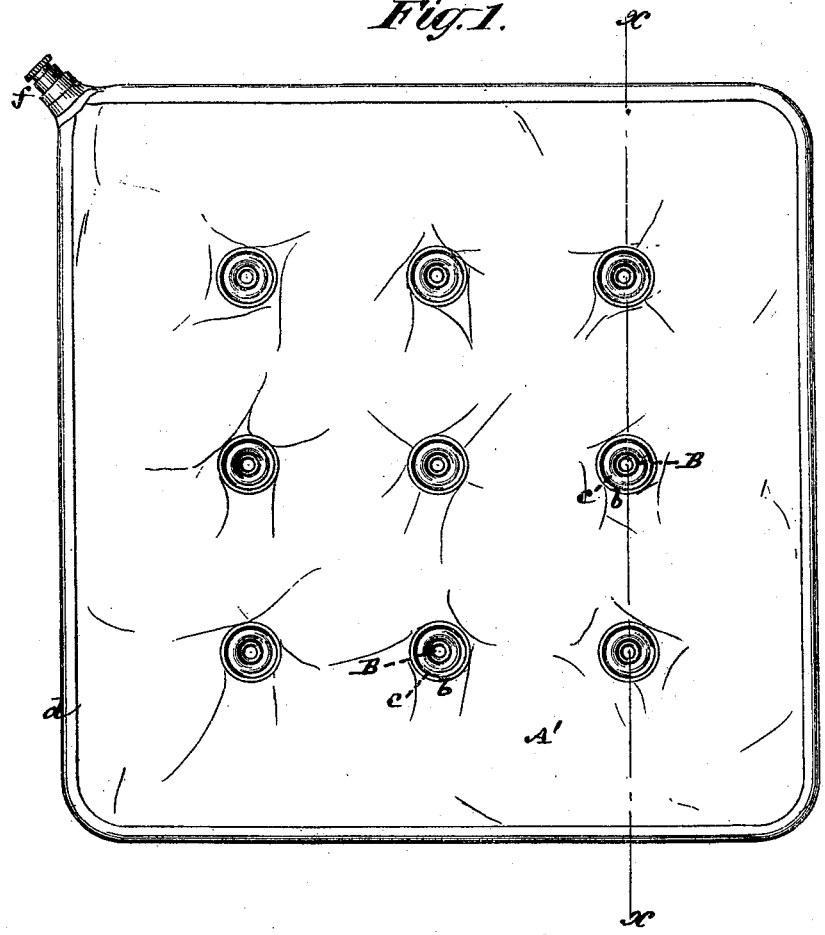
Figure 2:
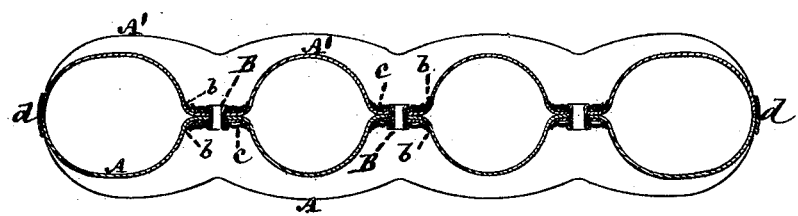

Figure 1 represents an outside face view of an air bed or cushion constructed in accordance with my invention, and Fig. 2 a transverse section of the same on the line x x.

A A' indicate the covering or material of which the bed or cushion is composed, and which may be rubber, cloth, or other air-tight material. Thus I propose to take a sheet, A, of unvulcanized india-rubber cloth, and lay it on a bench with the rubber side undermost. The intended position of the eyelets B is then marked upon said cloth, and on one or both sides of the cloth, at such places, are cemented a disk, b, of rubber coated on both sides with rubber solution. This forms the one or bottom sheet A of the bed or cushion. The top sheet A', of corresponding material, having like rubber disks b applied to it, is then laid on the under sheet A, and holes punched through the sheets A A', and through the center of the several disks, which are arranged so that the disks of the upper sheet face or lie over the disks of the lower sheet. The metallic or other eyelets B, having smooth edges, are then passed through said holes, and the same secured at their ends in the usual manner of fastening eyelets, metal washers c, if necessary, being combined with the latter. The edges of the top and bottom sheets A A' are then brought together, so as to abut against each other, and the same united by tapping them on a suitable anvil, so as to cause them to firmly adhere together, after which they may be further secured by strips d of rubber cloth, which are cemented over said edges.

The bed or cushion when made of rubber or rubber cloth, as described, is then vulcanized in the usual or any suitable manner.

Said bed or cushion may be inflated, or kept inflated, between the parts united by the eyelets by means of a valvular nozzle or attachment, f.

I claim—

An air bed or cushion having its upper and lower or opposite surfaces united at regular or irregular distances by means of eyelets, substantially as specified.

WILLIAM BOGGETT.

Witnesses:
J. G. TONGUE,
34 *Southampton Buildings, London, W. C.*
CHAS. W. OSMAN,
34 *Southampton Buildings, London, W. C.*